(12) United States Patent
Velayutha

(10) Patent No.: US 6,474,452 B2
(45) Date of Patent: *Nov. 5, 2002

(54) POLYMER BASED BACKING PLATES FOR RAILWAY BRAKE SHOES AND DISC PADS

(75) Inventor: Raj Velayutha, North Parramatta (AU)

(73) Assignee: Westinghouse Air Brake Co., Wilmerding, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,969

(22) Filed: Dec. 22, 1999

(65) Prior Publication Data

US 2002/0053492 A1 May 9, 2002

(51) Int. Cl.$^7$ ................................ F16D 69/00
(52) U.S. Cl. .............. 188/251 A; 188/250 B; 188/251 M
(58) Field of Search .............. 188/258, 251 A, 188/251 M, 250 B, 218 XL, 247; 264/113; 523/444, 527, 494

(56) References Cited

U.S. PATENT DOCUMENTS

| | | | | | |
|---|---|---|---|---|---|
| 4,173,681 A | * | 11/1979 | Durrieu et al. | ......... | 188/251 A |
| 4,197,352 A | * | 4/1980 | Emmett et al. | ......... | 188/251 A |
| 5,380,776 A | * | 1/1995 | Hibbert | ............... | 524/145 |
| 5,704,454 A | * | 1/1998 | Kahr | ............... | 188/247 |
| 5,984,055 A | * | 11/1999 | Strasser et al. | ......... | 188/250 A |
| 6,022,502 A | * | 2/2000 | Lockhart et al. | ............. | 264/113 |

* cited by examiner

Primary Examiner—Matthew C. Graham
Assistant Examiner—Mariano Sy
(74) Attorney, Agent, or Firm—James Ray & Associates

(57) ABSTRACT

A lightweight backing plate for use with at least one of a railway brake shoe and a disc brake pad. Such lightweight backing plate being formed from a predetermined polymeric material selected from a group consisting of unsaturated polyester, polyphenylene sulfide, glass epoxy, phenolic polymers and various combinations thereof.

15 Claims, 2 Drawing Sheets

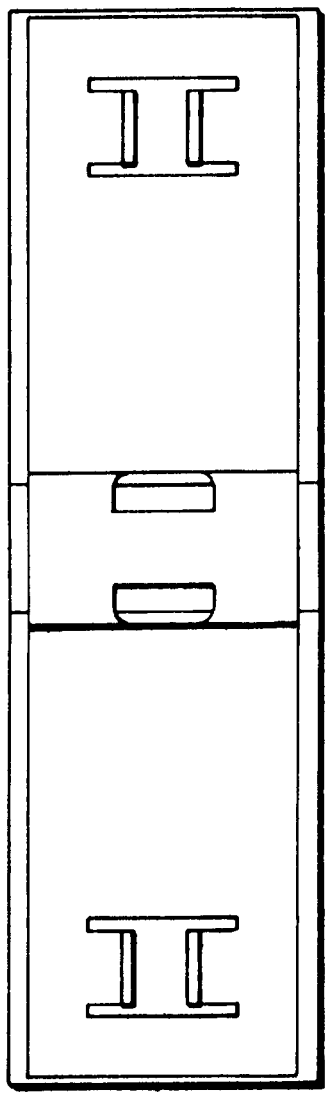
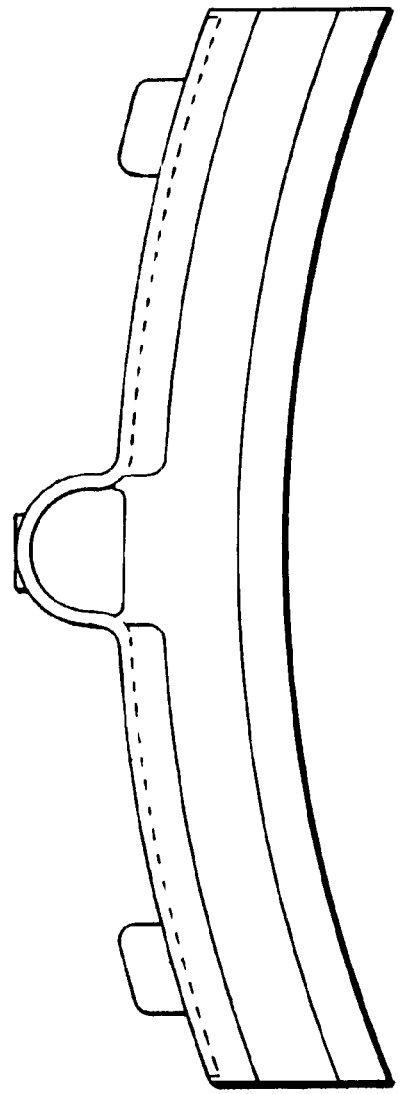
FIG. 1
PRIOR ART
FIG. 2
PRIOR ART

POLYMER BASED BACKING PLATES FOR RAILWAY BRAKE SHOES AND DISC PADS

FIELD OF THE INVENTION

The present invention relates, in general, to backing plates on brake shoes for railway vehicles, i.e. railway cars and locomotives, as well as backing plates for disc pads for railway and automotive applications and, more particularly, this invention relates to polymer based backing plates as a replacement for the steel plates presently in use.

BACKGROUND OF THE INVENTION

Backing plates have been used for countless years to attach a brake shoe to a brakehead. Brake shoes, be they steel shoes, wooden shoes or the variety of composition shoes used throughout the railroad industry, are mounted or bonded onto a backing plate. This unit is then connected to a brakehead. Through the years the industry has seen many improvements in backing plates. Most of these improvements have been concerned with more securely mounting the backing plate and thus the brake shoe to the brakehead.

Various lug arrangements, anchoring tongues and a variety of modifications have been employed to more firmly anchor the backing plate to the brakehead. However, through all of the years there has not been any changes in the composition of backing plates. That is, backing plates, used with composition brake shoes, have been and still are formed from metal. Generally, if not always, the metallic material used to make these backing plates is steel. By using steel the backing plates incur all the advantages and also the disadvantages which are inherent with this material.

SUMMARY OF THE INVENTION

The present invention provides, in a first embodiment thereof, a lightweight backing plate for use with at least one of a railway brake shoe and a disc brake pad. The lightweight backing plate being formed from a predetermined polymeric material selected from a group consisting of unsaturated polyester, polyphenylene sulfide, glass epoxy, phenolic polymers and various mixtures thereof.

In a second embodiment, the present invention provides a composition brake shoe for use with at least one of railway vehicle brakes and automotive brakes. The brake shoe comprises a lightweight backing plate which is formed from a predetermined polymeric material selected from a group consisting of unsaturated polyester, polyphenylene sulfide, glass epoxy, phenolic polymers and various mixtures thereof. The brake shoe further includes a preselected friction type composition material having a predetermined shape. The friction type composition material being bonded to the lightweight backing plate.

According to a third embodiment of the invention there is provided a method of manufacturing an improved brake block for use with at least one of railway brake shoes and disc brake pads. The method comprises the steps of selecting a composition friction material. Molding the composition friction material, at a predetermined temperature and a predetermined pressure, to form a predetermined shape for use as at least one of a brake shoe and a brake pad. Selecting a polymeric material from a group consisting of unsaturated polyester, polyphenylene sulfide, glass epoxy, phenolic polymers and various combinations thereof. Forming a backing plate from the preselected polymeric material into a predetermined configuration and bonding the composition friction material to the backing plate.

OBJECTS OF THE INVENTION

It is, therefore, one of the primary objects of the present invention to manufacture a backing plate from a preselected polymeric material.

Another object of the present invention is provide a backing plate which will generally extend the useable life of a brake shoe.

It is still another object of the present invention to provide a lightweight backing plate that will be substantially easier to manufacture.

Yet another object of the present invention is to provide a lightweight backing plate which will be less expensive to produce than presently used backing plates.

An additional object of the present invention is to provide a method of forming a backing plate that can be made in situ during molding of the friction materials.

These and various other objects and advantages of this invention will become apparent after a full reading of the following detailed description, particularly, when read in conjunction with the attached drawings as described below and the appended claims.

BRIEF DESCRIPTION OF THE DRAWINGS

FIG. 1 is a plan view of the back of a conventional prior art railway brake shoe showing a steel backing plate used for mounting a brake shoe to a railway vehicle.

FIG. 2 is a side elevation view of the prior art railway brake shoe illustrated in FIG. 1.

Figure 3:
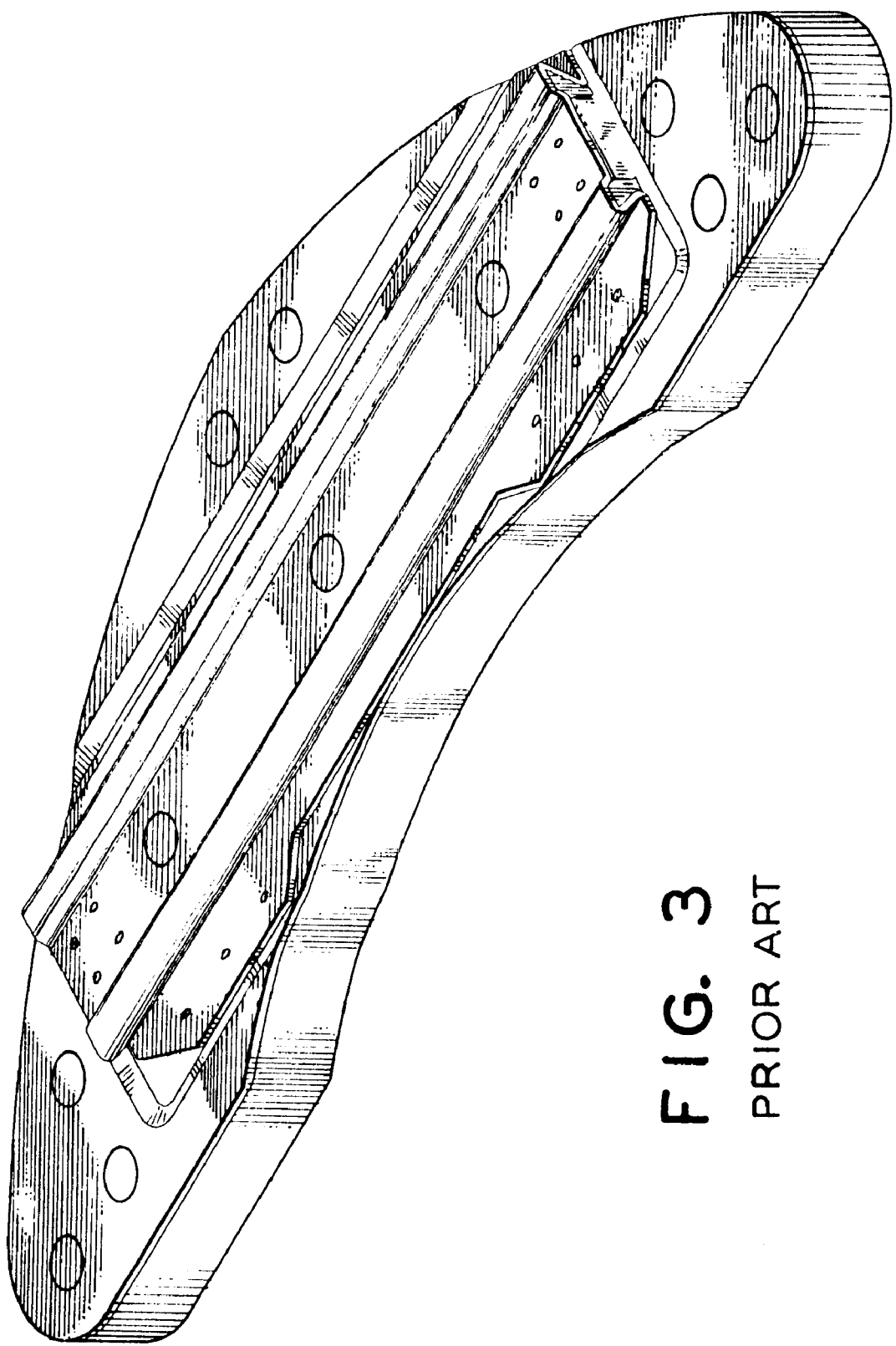
FIG. 3 is an isometric view of a prior art disc brake assembly showing a disc pad affixed to a steel backing plate.

BRIEF DESCRIPTION OF THE PRESENTLY PREFERRED AND VARIOUS ALTERNATE EMBODIMENTS OF THE INVENTION

Illustrated in FIGS. 1, 2 and 3 is a prior art brake shoe and a prior art disc brake pad with metallic backing plates and composition brake shoes secured to the backing plates. The present invention does not alter the basic configuration of the backing plates, nor does the present invention alter the composition brake shoe or brake pad design.

The present invention is applicable to a wide variety of backing plates and the ones illustrated in FIGS. 1–3 are only used as typical examples.

The present invention provides a lightweight backing plate that is formed from a polymeric composite for use as a backing plate for brake shoes or brake pads. In a first embodiment of the invention such polymeric composite is selected from a group consisting of unsaturated polyester, glass epoxy, phenolic, polyphenylene sulfide polymers and various combinations thereof.

In a presently preferred embodiment of the invention such polymeric composite is an unsaturated polyester. Such unsaturated polyester is a thermosetting type resin. In the presently preferred embodiment of the invention such unsaturated polyester is a styrene polyester resin. It is also presently preferred that such resin be modified by containing glass fiber reinforcement and mineral fillers.

It is important that the material used to replace steel in a backing plate generally be very durable and have excellent dimensional stability. The above described resins possess the required properties. These resins provide products that are considerably lighter than steel. In an industry where weight is always an important factor any reduction in the weight of any of the necessary components in any of the railway vehicles is very welcome. Not only does the use of polymers provide a lighter backing plate but plates made of polymeric material are generally less expensive to make than the presently used steel plates.

The above listed advantages are very desirable; however, probably the major feature of having a backing plate produced from a polymeric material and not steel is that the brake shoes and/or brake pads will normally have a longer useful life. With presently used brake shoes bonded to steel backing plates there is still considerable usable brake life left in the shoes when the shoes have to be condemned, in order to prevent the steel backing plate from ruining the brake discs or wheels.

With the present invention of a backing plate formed from a polymeric material, the brake shoe can be used well beyond what would have been the condemning point of a shoe with a steel backing plate. Thus, a longer useful life of a brake shoe is derived. This provides a considerable cost saving in that more of the brake shoe can be used before it has to be replaced. In addition, the longer interval between brake pad changes means that less time will be needed than is required to make the more frequent changes that are presently necessary which is another cost savings.

Other important features of having the backing plate of a brake shoe constructed of a polymeric material is that no special glues are required to bond the friction material to the backing plate. Also, the backing plates can be made in situ during molding of the friction materials. Further, the backing plate will not be subject to corrosion and avoids substantially all of the problems that corrosion can lead to. In addition, with the use of such polymeric backing plate it is possible to pulverize the entire brake shoe, after it has served its useful life, which will permit the recycling of the friction material that is used for the brake shoe. This is not possible with the use of the present metal type backing plates.

Thus, the present invention provides many advantages over the steel backing plates that are presently used and further do not require any changes to ancillary items, such as brakeheads, since the backing plate design is basically the same. Much of the description and advantages described supra have been related to the use of polymeric backing plates for brake shoes and pads for the railroad industry; however, the invention is not limited to railway braking systems but also finds application in the automotive industry.

A second embodiment of the invention provides a composition brake shoe for use with at least one of railway vehicle brakes and automotive brakes. The brake shoe comprises a lightweight backing plate member. The lightweight backing plate member being formed from a predetermined polymeric material selected from a group consisting of unsaturated polyester, polyphenylene sulfide, glass epoxy, phenolic polymers and various combinations thereof. There is a preselected friction type composition material having a predetermined shape that is bonded to the at lightweight backing plate member.

It is presently preferred that such polymeric composite be modified by incorporating a glass fiber reinforcement therein. It is also presently preferred that such polymeric composite include mineral fillers. In a presently preferred embodiment of the invention such polymeric composite is an unsaturated polyester. Such unsaturated polyester is a thermosetting type resin. In the presently preferred embodiment of the invention such unsaturated polyester is a styrene polyester resin.

According to a third embodiment of the invention there is provided a method of manufacturing an improved brake block for use with at least one of railway brake shoes and disc brake pads. The method comprises the steps of selecting a composition for use as a friction material and then molding such selected composition friction material into a predetermined shape for use as at least one of a brake shoe and a brake pad. Such predetermined shape depends on whether the composition friction material is to be used for a railway brake shoe or for a disc brake pad for either railway or automotive applications. Such composition friction material is molded at both a predetermined temperature and a predetermined pressure.

Another step in the method includes the selection of a polymeric material to form the backing plate. Such polymeric material is selected from a group consisting of unsaturated polyester, polyphenylene sulfide, glass epoxy, phenolic polymers and various combinations thereof. The selected polymeric material is formed into a backing plate with a predetermined configuration. The configuration of the backing plate is also determined by the end use of the product. For example, the backing plate may be used for railway brake shoes or disc brake pads or for automotive disc brakes. Again, even if the backing plate is designed for railway brake shoes, the configuration may be that of a typical backing plate with a keybridge or any of the various configurations that are being used in the industry with the various lugs and tongues presently employed for securely mounting such brake shoe to a brakehead.

The composition friction material that was molded into such predetermined shape in a previous step is bonded to the backing plate that was formed into a predetermined configuration in a previous step. It should be obvious to persons who are skilled in the relevant art that the steps described above are not necessarily listed in a sequential manner. It could be more advantageous to some that the baking plate be formed first and the composition friction material later.

In one presently preferred alternative embodiment of the method for manufacturing such brake shoe and disc brake having a backing plate made of a polymeric material, such backing plate member is formed in situ during the molding of the composition friction material. This is a step that, prior to the present invention, could never be accomplished because the backing plates were made of metal.

It is presently preferred that such polymeric composite be modified by incorporating a glass fiber reinforcement therein. It is also presently preferred that such polymeric composite include mineral fillers. In a presently preferred embodiment of the invention such polymeric composite will be an unsaturated polyester and that such unsaturated polyester is a thermosetting type resin. In the presently preferred embodiment of the invention such unsaturated polyester is a styrene polyester resin.

While both the presently preferred and a number of alternative embodiments of the present invention have been described in detail above it should be understood that various other adaptations and modifications of the present invention can be envisioned by those persons who are skilled in the relevant art of brake shoes and railway braking systems without departing from either the spirit of the invention or the scope of the appended claims.

I claim:

1. A composition brake shoe for use with railway vehicle brakes in which a useful life of said composition brake shoe is extended over that of a conventional composition brake shoe with a metallic backing plate in that significantly more of said composition brake shoe can be used before a condemning point of said composition brake shoe is reached, said brake shoe comprising:

(a) a lightweight backing plate member, said backing plate member being formed from a predetermined polymeric material selected from a group consisting of unsaturated polyester, polyphenylene sulfide, glass epoxy, phenolic polymers and various combinations thereof; and (b) a preselected friction type composition material having a predetermined shape bonded to said lightweight backing plate member, said preselected friction type composition material at least includes some polymeric material selected from said group consisting of unsaturated polyester, polyphenylene sulfide, glass epoxy, phenolic polymers, at least a portion of said preselected friction type composition material includes material from recycled composition brake shoes.

2. A composition brake shoe, according to claim 1, wherein said preselected friction type composition material is bonded to said lightweight backing plate member during molding.

3. A composition brake shoe, according to claim 1, wherein said lightweight backing plate member includes means for securing said composition brake shoe to a brake beam disposed on a railway vehicle.

4. A composition brake shoe, according to claim 3, wherein said means for securing said composition brake shoe to such brake beam is a keybridge.

5. A composition brake shoe, according to claim 1, wherein said predetermined polymeric material includes a glass fiber reinforcing.

6. A composition brake shoe, according to claim 1, wherein said predetermined polymeric material includes mineral fillers.

7. A composition brake shoe, according to claim 1, wherein said predetermined polymeric material is an unsaturated polyester.

8. A composition brake shoe, according to claim 7, wherein said unsaturated polyester contains styrene.

9. A composition brake shoe for use in braking in which a useful life of said composition brake shoe is extended over that of a conventional composition brake shoe with a metallic backing plate in that significantly more of said composition brake shoe can be used before a condemning point of said composition brake shoe is reached, said brake shoe comprising:

(a) a lightweight backing plate member being formed from a predetermined polymeric material selected from a group consisting of unsaturated polyester, polyphenylene sulfide, glass epoxy, phenolic polymers and various combinations thereof; and (b) a preselected friction type composition material having a predetermined shape bonded to said lightweight backing plate member, said preselected friction type composition material at least includes some polymeric material selected from said group consisting of unsaturated polyester, polyphenylene sulfide, glass epoxy, phenolic polymers, at least a portion of said preselected friction type composition material includes material from recycled composition brake shoes.

10. A composition brake shoe, according to claim 9, wherein said preselected friction type composition material bonded to ;id lightweight backing plate member can be pulverized as a unit so as to permit recycling of said preselected friction type composition material.

11. A composition brake shoe, according to claim 9, wherein said preselected friction type composition material is bonded to said lightweight backing plate member during molding.

12. A composition brake shoe, according to claim 9, wherein said predetermined polymeric material includes a glass fiber reinforcing.

13. A composition brake shoe, according to claim 9, wherein said predetermined polymeric material includes mineral fillers.

14. A composition brake shoe, according to claim 9, wherein said predetermined polymeric material is an unsaturated polyester.

15. A composition brake shoe, according to claim 14, wherein said unsaturated polyester contains styrene.

* * * * *